Jan. 27, 1970    R. H. NEUSEL    3,492,597

CERAMIC TUBE FOR GAS ION LASER

Filed Aug. 1, 1966

Robert H. Neusel,
INVENTOR.

BY

Donald W. Graves
ATTORNEY.

United States Patent Office 3,492,597
Patented Jan. 27, 1970

3,492,597
CERAMIC TUBE FOR GAS ION LASER
Robert H. Neusel, Palos Verdes Estates, Calif., assignor to TRW Inc., Redondo Beach, Calif., a corporation of Ohio
Filed Aug. 1, 1966, Ser. No. 569,226
Int. Cl. H01s 3/22
U.S. Cl. 331—94.5                                           1 Claim

ABSTRACT OF THE DISCLOSURE

To prevent fissuring of glass tubes in a gas ion laser and subsequent fogging of Brewster windows a laser cavity is formed by enlarged glass tubes connected to a smaller diameter ceramic laser cavity.

A first constriction is formed between the glass tube and the ceramic tube and a second constriction in the ceramic tube is formed whereby to dissipate heat away from the enlarged glass tubes.

---

Within the last few years laser devices have been developed. The term "laser" stands for light amplification by stimulated emission of radiation. The first laser devices comprise a pink ruby cylinder having traces of chromium. The end faces of the cylinder were made parallel and reflecting, with one surface less reflective than the other. Upon proper excitation by a suitable light source, a coherent beam of radiation at a high energy level passes through the less reflective mirror. Within recent years, laser devices comprising gas filled tubes have come into their own. These tubes are excited by the use of a cathode and anode. With these types of lasers, however, using argon, krypton or xenon, a problem arises when Pyrex or quartz glass is used as the tube material. While these materials are easy to fabricate, the tube walls tend to absorb gas, resulting in fissures that structurally weaken the tube. The material from these fissures often fog the Brewster windows at each end of the tube.

This invention comprises a gas ion laser tube in which the laser cavity and constricted portion of the tube are constructed of ceramic which is sealed to the remainder of the laser structure.

The objects and advantages of this invention will become apparent as this description proceeds taken in conjunction with the drawing in which.

Figure 1:
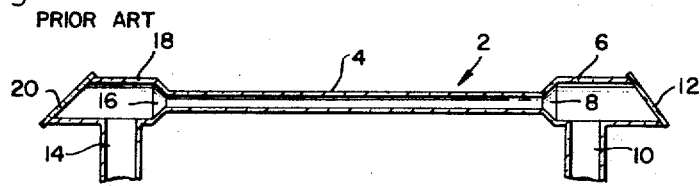
FIGURE 1 is a view in cross section of a typical gas ion laser tube known in the prior art.

Referring now to FIGURE 1, a portion of a laser device 2 is shown which is typical of prior art gas ion laser constructions. For purposes of simplification, the laser cavity is shown and consists of tube 4. The laser device itself is constructed of Pyrex or quartz. A larger area portion is shown at 6 and a constriction or transition area 8 is provided. Tube 10 contains an electrode which, in the example given, comprises the cathode. A conventional Brewster window 12 is provided. In a similar manner an anode is provided in tube portion 14 with a constriction 16 formed between tube 4 and tube 18 which is in turn closed by Brewster window 20.

With this type of construction, the constricted portion 8 becomes quite hot during operation due to ion bombardment by the noble gas, which may be argon, krypton or xenon. It has been found, for example, that after 30 or 40 hours of operation at 20–60 amps with 50 microsecond current pulsed at a rate of 60 per second, that the plasma attacks the glass. This results in fissures that not only structurally weaken the tube but in addition causes fogging of the Brewster windows with material from the fissures.

These effects are minimized and for all practical purposes eliminated by constructing the tube according to this invention.

Figure 2:
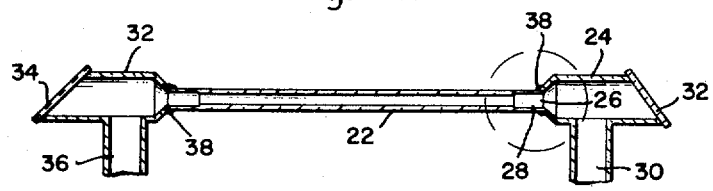
FIGURE 2 is a cross sectional view of a gas ion laser tube constructed according to this invention.

Referring now to FIGURE 2, a laser tube similar to that shown in FIGURE 1 is illustrated but with an important difference. Thus, a tube 22 connects to an enlarged tube 24 forming a first constriction and a second constriction 28. Tube 30 contains a cathode and a Brewster window 32 closes off tube 24. In a similar manner, the other end of tube 22 connects to a larger tube, which has Brewster window 34, and connecting tube 36 which contains the anode.

Instead of constructing tube 22 of Pyrex or quartz, this invention provides that the tubing be constructed of a ceramic impervious to a gas at 1000° C. or higher and which can be directly sealed to glass. An example of this ceramic is Mullite MV20 produced by McDanel Refractory Porcelain Company. Other examples are zircon, alumina and beryllia.

This ceramic is in turn sealed to the larger tubes by a glass to ceramic seal. This seal is a mechanical seal formed by heat.

The glass is preferably a uranium glass such as produced by Corning Glass Works. This is known as Corning Glass 3320 which in turn can be directly sealed to Pyrex glass.

Figure 3:
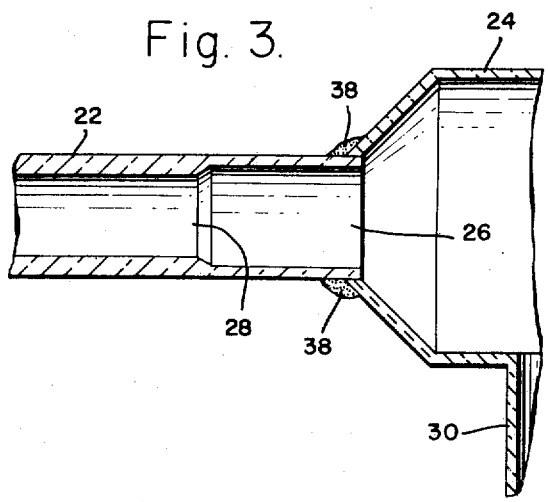
FIGURE 3 is an enlarged view of a portion of the tube shown in FIGURE 2.

Since a glass to ceramic seal has a tendency to break under high temperature due to different thermal characteristics, and since a great deal of heat is generated at the constriction between small bore 22 and large tube 24, the final constriction is made in the ceramic material at a point removed from the glass to ceramic seal. Thus, as shown in FIGURES 2 and 3, an intermediate constriction is formed at 26 which is adjacent the ceramic to glass seal 38. The final constriction and wherein the greatest heat is generated is shown at 28 which can be seen is not in the area of the glass to ceramic seal.

It has been found that after 200 hours of operation that practically no fissuring of the ceramic occurred, and that the Brewster windows were not subjected to fogging. This is in contrast to the typical quartz or Pyrex tubes which have observable fissuring and fogging after 40 hours of operation.

Thus, it can be seen that by providing a ceramic laser tube with the constriction formed within the ceramic tube, that a longer life laser device is achievable. In addition, by making the ceramic to glass seal at a point spaced from the constriction, cracking problems due to intense heat generated at the constriction have been eliminated.

What is claimed is:
1. A gas ion laser comprising:
a laser cavity having an enlarged glass tube containing an anode at one end of said cavity and an enlarged glass tube containing a cathode at the other end of said laser cavity, said laser cavity being formed by a tube constructed of ceramic, said ceramic tube having a smaller diameter than said glass tubes;
a first constriction formed between said enlarged glass tubes and said ceramic tube, said enlarged glass tubes being connected to said ceramic tube by a ceramic to glass seal;
a second constriction formed in said ceramic tube at the ends thereof;
whereby to dissipate heat away from said glass tubes.

(References on following page)

References Cited

UNITED STATES PATENTS 3,394,320   7/1968   Medicus _____ 331—94.5

OTHER REFERENCES

Gould, Applied Optics Supplement 2, 1965, pp. 59–67.
Piltch et al., Appl. Phys. Letters, vol. 7, Dec. 1, 1965, pp. 309–310.

Piltch et al., Review of Scientific Instruments, vol. 37, pp. 925–927, July 1966.

ROY LAKE, Primary Examiner

S. H. GRIMM, Assistant Examiner

U.S. Cl. X.R.

330—4.3